United States Patent

[11] 3,545,701

[72] Inventors: Jean Henri Bertin
Neuilly-sur-Seine;
Marcel Pierre Le Nabour, Maisons-Laffitte;
Jean Lucien Charles Cayla, Versailles,
France
[21] Appl. No.: 731,869
[22] Filed: May 24, 1968
[45] Patented: Dec. 8, 1970
[73] Assignee: Bertin & Cie
Plaisir, France
a company of France
[32] Priority: May 24, 1967, Feb. 26, 1968
[33] France
[31] Nos. 107,669 and 141,237

[54] LIFT OR LIFT/PROPULSION SYSTEM FOR AIRCRAFT
11 Claims, 28 Drawing Figs.
[52] U.S. Cl. ..................................... 244/12, 244/42
[51] Int. Cl. ..................................... B64c 21/04, B64c 3/00
[50] Field of Search ................................. 244/12, 15, 23, 42, 42.4, 42.41, 42.48

[56] References Cited
UNITED STATES PATENTS

| | | | |
|---|---|---|---|
| 2,077,070 | 4/1937 | Rose | 244/42 |
| 2,464,663 | 3/1949 | Zingg | 244/12 |
| 3,066,891 | 12/1962 | Seager | 244/23 |
| 3,068,647 | 12/1962 | Santamaria et al. | 244/15 |
| 3,085,770 | 4/1963 | Sutton | 244/23 |
| 3,188,021 | 6/1965 | Young | 244/42 |

Primary Examiner—Milton Buchler
Assistant Examiner—James E. Pittenger
Attorney—Alfred W. Breiner ABSTRACT: Lift and propulsion system for aircraft. A set of hollow elements is carried within the wings. A fluid under pressure flows through the elements and is allowed to escape therefrom in such manner that its flow entrains with it part of the surrounding atmosphere air after the fashion of an ejector and that the mixture consisting of said fluid and the entrained air be directed downwardly in order to support the aircraft.

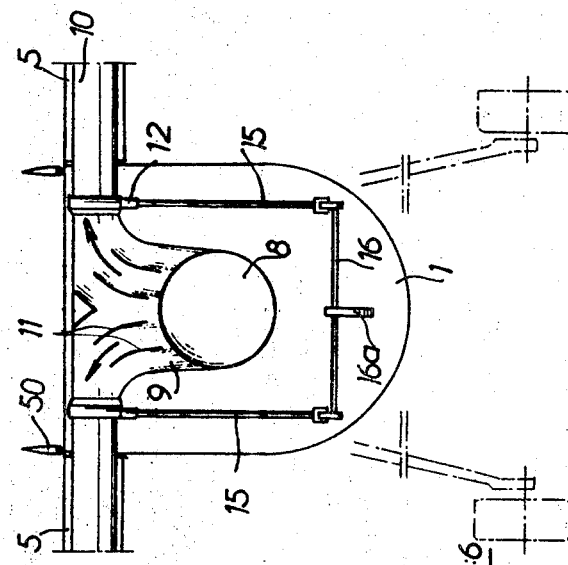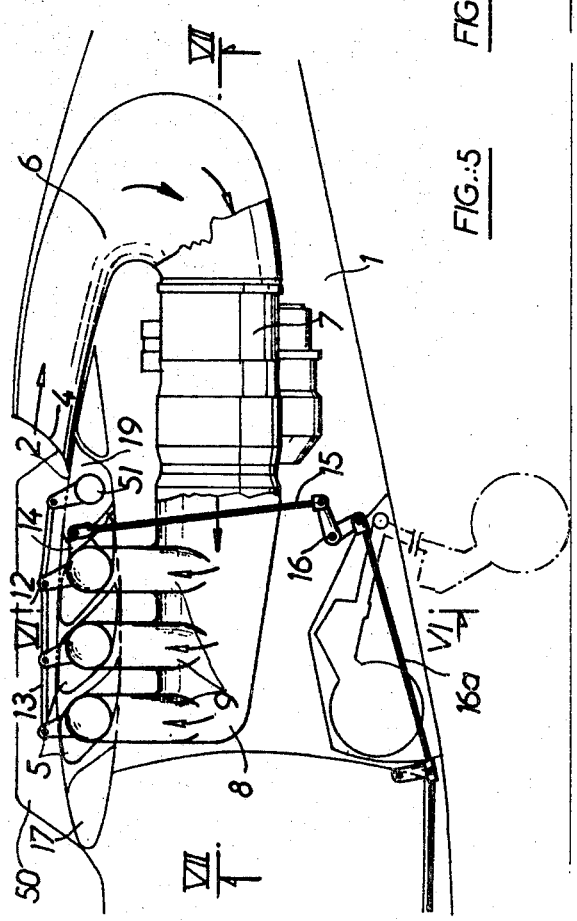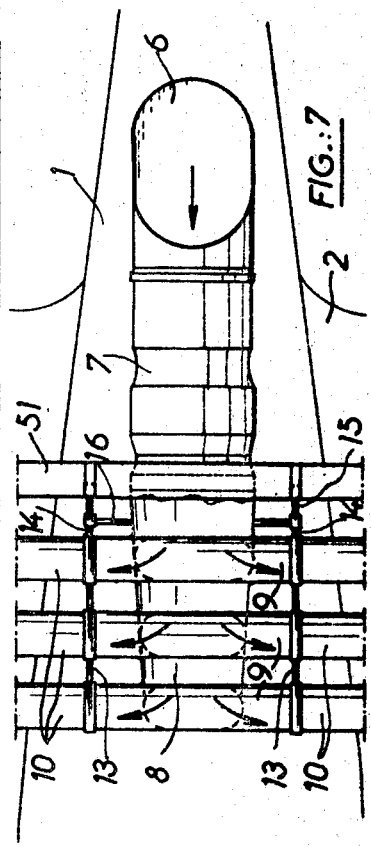

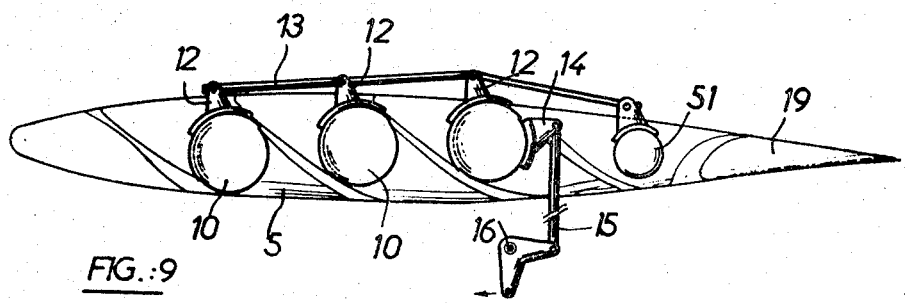
FIG.:8
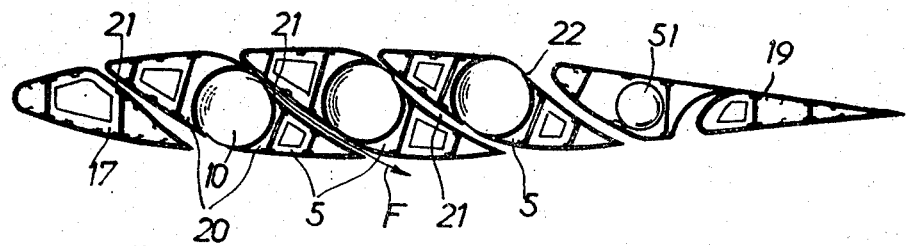
FIG.:9
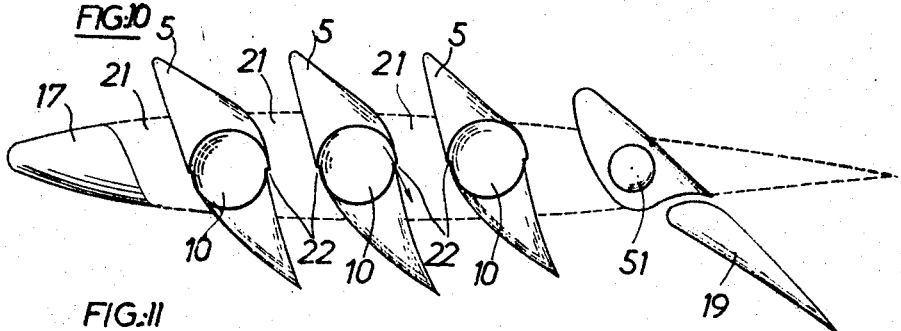
FIG.:10
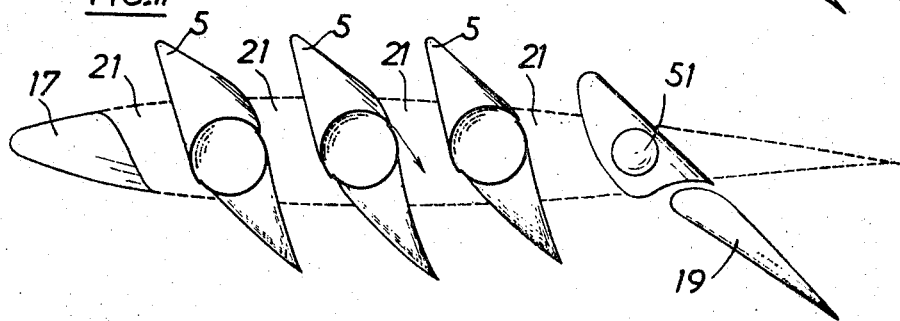
FIG.:11

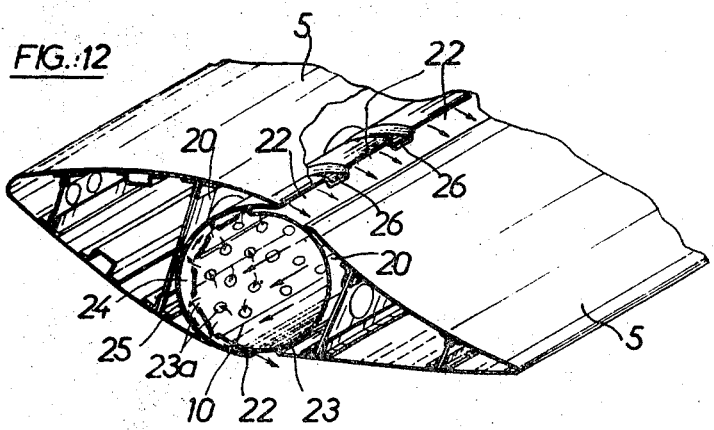
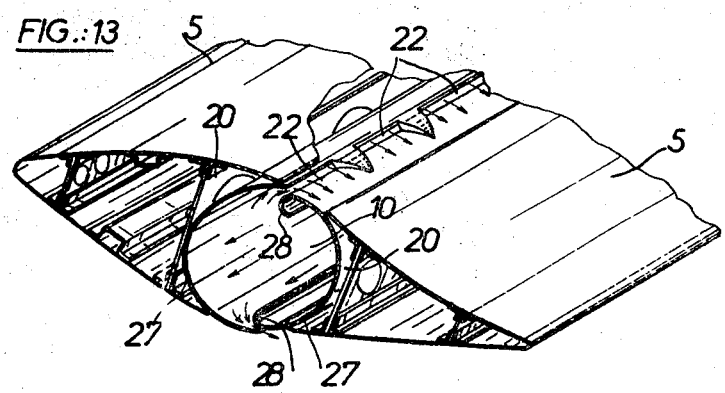
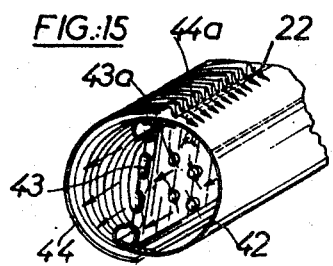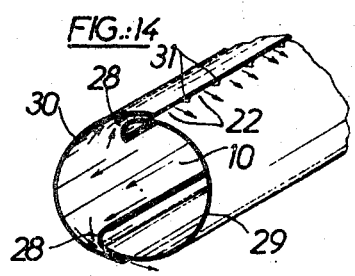
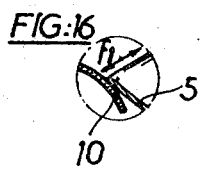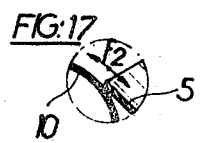

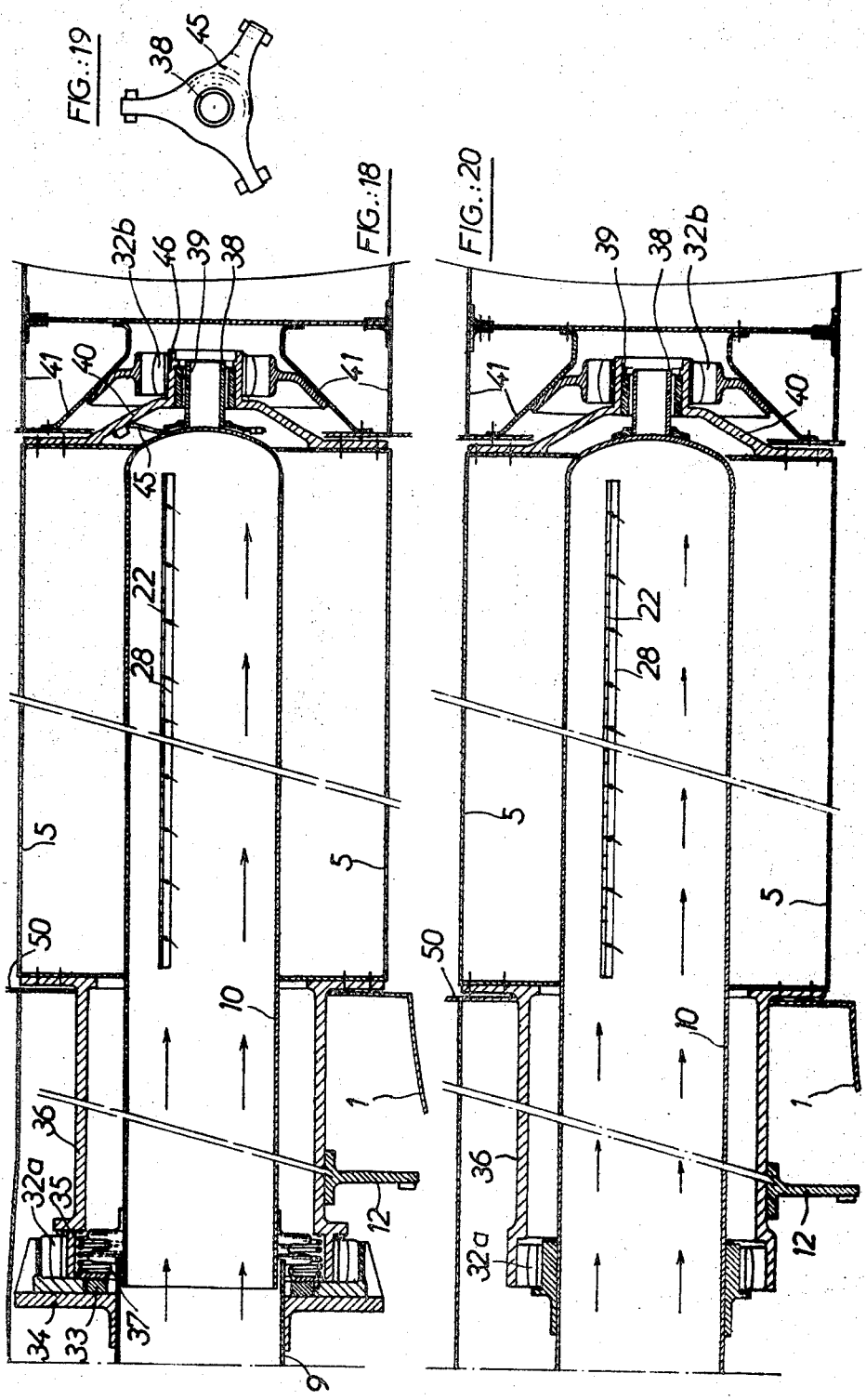

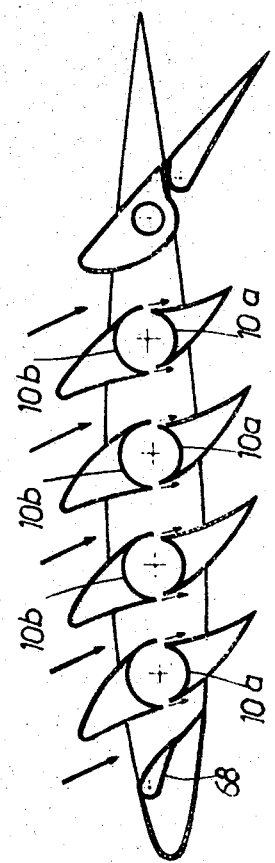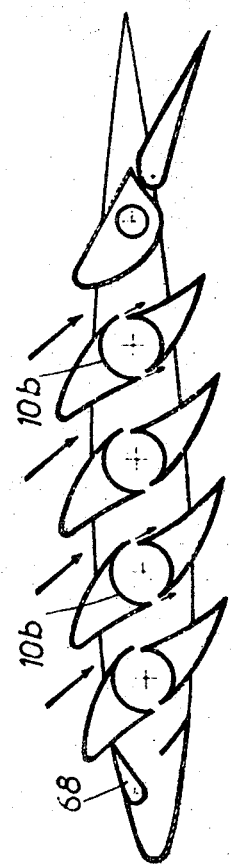

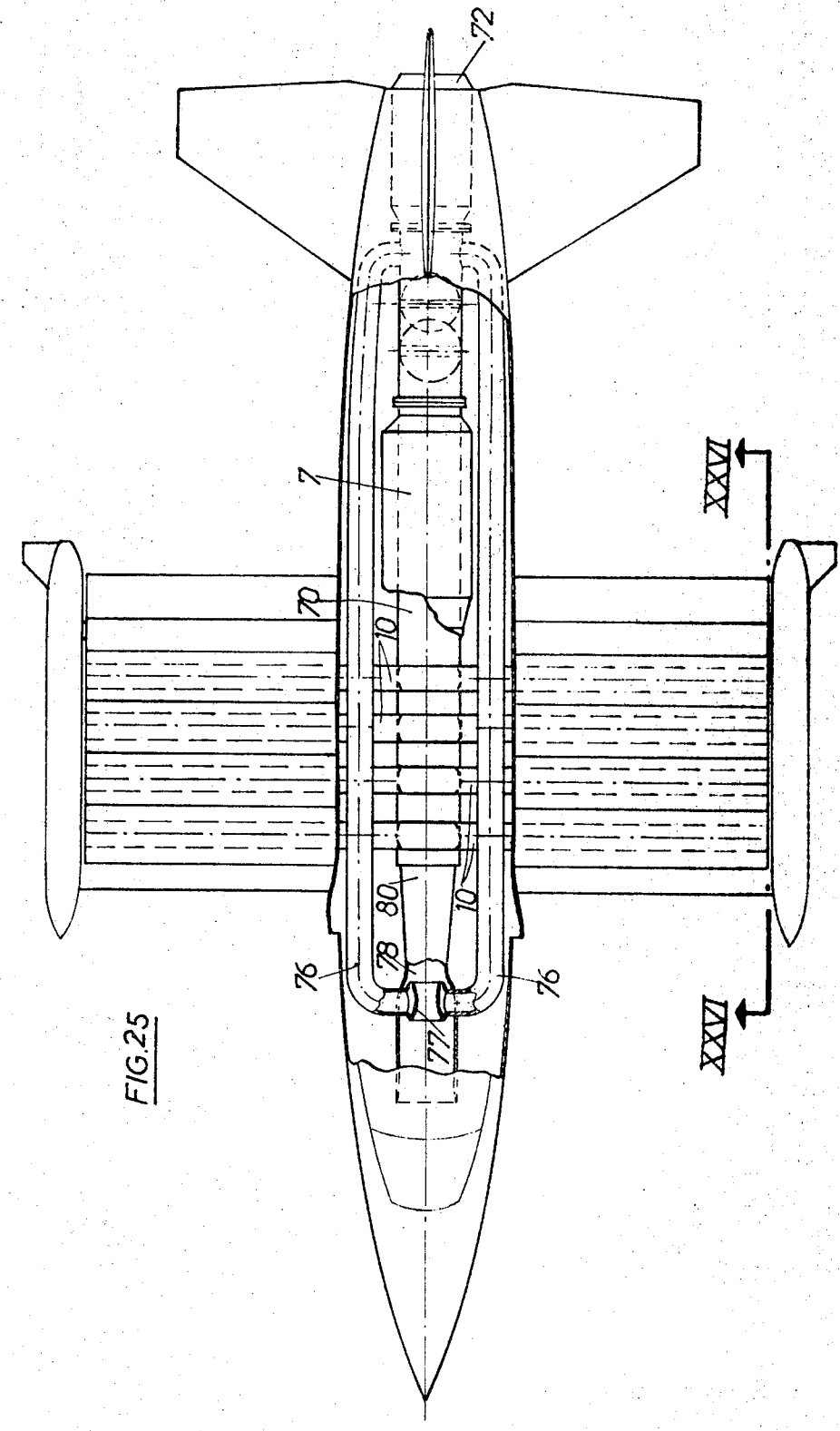

LIFT OR LIFT/PROPULSION SYSTEM FOR AIRCRAFT

This invention relates to a lift system or a combined lift and propulsion system for aircraft.

It is well known that three consecutive phases are involved in an aircraft mission, to wit takeoff, flight and landing. During the flight proper, the speed of the aircraft is sufficient to create, by the reaction of the air on the wings, an aerodynamic lift force capable of balancing the weight of the aircraft. This is not so however at takeoff and landing, and it is well known that an aircraft of conventional design must taxi along the ground over an often considerable distance in order to acquire sufficient speed to become airborne.

It is the object of the present invention to provide as short as possible aircraft takeoffs and landings.

In its broader aspects, the invention has for its object to make it easier to keep an aircraft airborne when its aerodynamic lift is low or null, particularly during takeoff and landing, and also to propel the aircraft.

An aircraft according to this invention accordingly comprises a set of hollow elements carried within the wings and through which flows a fluid under pressure which is allowed to escape therefrom in such manner that its flow entrains with it part of the surrounding atmosphere air after the fashion of an ejector and that the mixture consisting of said fluid under pressure and the entrained air be directed downwardly in order to support the aircraft. It is an important teaching of this invention that these hollow elements may be movable.

The deflection of these elements forms throats, the width of which can be adjusted according to the flight speed of the aircraft in order to obtain an optimum air flow.

The hollow elements can be variously orientated in relation to one another by differential deflection thereof, whereby to control the position and direction of the resultant force according to the phases of flight.

The present invention relates more particularly to a combined jet lift and propulsion system capable of incorporation in aircraft of normally horizontal attitude, which are thereby endowed with the ability to take off and land in the shortest possible horizontal distance, yet fly at high cruising speeds.

The subject system of this invention comprises at least one gas generator feeding a set of ducts arranged spanwise through part at least of the wings and each embodying, along at least one generatrix thereof, slots for sets of thin jet-discharging tubes, each duct being enclosed by a streamlined member, termed a fairing, movable between two limit positions, to wit a retracted first position in which the fairings blend substantially into the normal wing profile and in which the gases discharged through the slots and debouching into the spaces between consecutive fairings are expelled from the wings horizontally or substantially horizontally and rearwardly, whereby to propel the aircraft, and an extended second position in which the fairings are deflected in order to increase the passageway between consecutive fairings and direct downwardly the resultant jet formed of the inductive flow discharged from the slots and the induced flow of atmosphere air drawn from the zone above the upper wing surface into said passageways whereby to provide lift for the aircraft.

The gas under pressure delivered by the generators can be used either wholly or partly to feed said hollow elements, that part of the fluid flow which is not used to feed these elements being then channelled into a duct equipped with a nozzle and discharging the gases in a substantially horizontal direction rearwardly of the aircraft. Preferably, this duct receives an afterburner device for delivering augmented thrust for a usually short phase of the flight. Where the speed of the aircraft permits, the supply to the fairings could be cut off completely, with the wing providing the necessary lift unassisted.

The variable-geometry system according to the present invention may be adapted to all or part only of the lift surfaces, the remainder consisting of conventionally designed wing surfaces.

The system is fed by one or more gas generators of any convenient type. Multiplying the number of gas generators may be desirable for safety reasons, in which case it is preferable to cross-connect them pneumatically so that failure of any one generator should not result in accidental aerodynamic asymmetry for the aircraft.

The gas generator or generators may be gas turbines, for example. Alternatively, they could consist of one or more suitably driven compressors. Alternatively still, a composite feed could be provided with cold gases from a blower and hot gases from a turbogenerator.

In the latter event, the blower could be mounted ahead of the compressor forming part of the hot gas producing turbogenerator.

In the so-called extended configuration corresponding to takeoff or landing, deflection of the movable fairings produces a sizable passageway between consecutive fairings that interconnects the upper and lower wing surface zones. The flow of driving gas discharged from the slots produces in this section a secondary or induced flow of atmosphere air from the upper wing surface zone. The resulting energy transfer produces a momentum and hence a downwardly directed thrust which greatly exceeds the basic thrust of the driving gas. This internal momentum has added to it the momentum of the downwardly deflected external flow, due to a multiple high-lift effect, possibly assisted by high-lift flaps when the aircraft is possessed of sufficient forward speed. This ensures sufficient lift force for the aircraft.

In the so-called retracted configuration, the driving gas is ejected through the much smaller gaps left between the fairings. This gas escapes outwardly and rearwardly, in a substantially horizontal direction, thereby propelling the aircraft in cruise flight.

In this second configuration, the secondary flow is much smaller than in the extended position but sufficient to cool the fairing walls.

Between these two limit positions of the system, there is an infinite number of possible intermediate positions corresponding to transition of the aircraft from slow-speed flight to high-speed flight, or vice versa.

The passageway between two consecutive fairings in the extended position can be determined so as to correspond to the section at which the system operates most efficiently.

In one form of embodiment, the ducts are fed by the gas generator through a common manifold chamber accommodated in the fuselage of the aircraft and distributing the gas symmetrically to either side of the fore-aft axis of the aircraft.

Owing to the difference in temperature which may exist between the ducts and the fairings, especially when the driving fluid is a hot gas, differential expansions may take place, particularly in the axial direction of the ducts. In one constructional form of the invention, means are provided to permit relative axial shifting between the ducts and the fairings.

In one particular embodiment of the invention, the ducts are made rigid with the fairings during the adjusting motion of the latter. To this end the ducts may be interconnected with the fairings by means of elastic coupling members which unite the two elements angularly but allow relative axial shifting therebetween. The axial forces developed by the compound system are absorbed by thrust bearings which are associated solely to the fairings in order not to subject the ducts to axial stresses.

In an alternative embodiment, the ducts are stationary and only the fairings are positionally adjustable.

The description which follows with reference to the accompanying nonlimitative exemplary drawings will give a clear understanding of how the invention can be carried into practice.

In the drawings:

FIG. 5 shows in partial longitudinal section the middle portion of the aircraft shown in FIG. 1, depicting a constructional form of the means for supplying driving gas to the lift propulsion system of the aircraft and control means of the positional settings of mobile portions of the wings;

FIG. 6 is a section on the line VI–VI of FIG. 5;

FIG. 7 is a section on the line VII–VII of FIG. 5;

FIGS. 8 through 11 are longitudinal sectional views of the active portion of the wings, showing the moving parts consisting of movable fairing elements which shroud ducts having driving gas flowing therethrough;

FIG. 8 shows on an enlarged scale control means of the movable elements, for varying the wing geometry;

FIG. 9 shows certain structural details relevant to both the fixed portion of the wings and the movable fairings, the latter being shown in a retracted position corresponding to high-speed flight;

FIG. 10 depicts a constructional form in which the fairings, shown in their extended position corresponding to slow-speed flight (landing or takeoff), are angularly united with the ducts which they shroud;

FIG. 11 is a view corresponding to FIG. 10, illustrating an alternative embodiment in which the fairings are rotatable about fixed ducts;

FIGS. 12 to 15 are perspective showings of possible embodiments of driving gas discharge slots;

FIGS. 16 and 17 are enlarged views of the point of contact between a duct and a fairing in FIGS. 12 and 13;

FIG. 18 is a cross-sectional view of one wing, showing an embodiment of bearings permitting rotation of the movable parts in cases where the fairing-duct assembly is movable;

FIG. 19 is a detail view of FIG. 18;

FIG. 20 is a corresponding view to FIG. 18, applicable in cases where the driving gas conveying ducts are fixed and only the fairings are movable;

FIGS. 24a and 24b are sectional views of the wing on an enlarged scale, showing two different possible methods of feeding the hollow elements;

FIG. 25 shows with partial cutaway an alternative embodiment of the device in FIG. 21;

Figure 1:
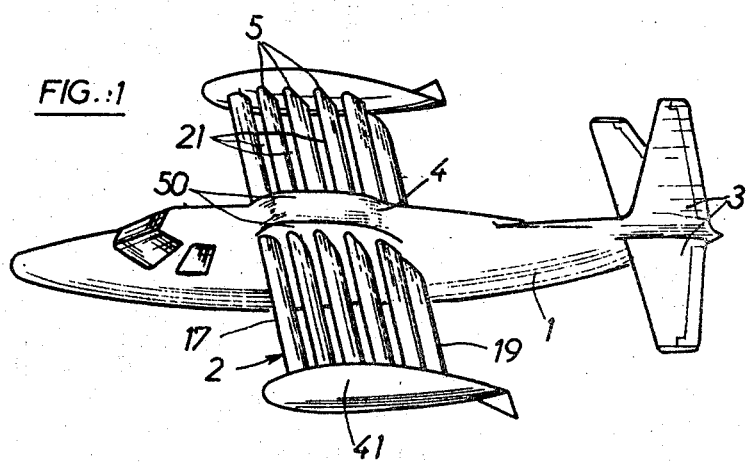
FIG. 1 is a schematic perspective showing of an aircraft equipped with a variable-geometry lift/propulsion wing according to the invention.
Figure 3:
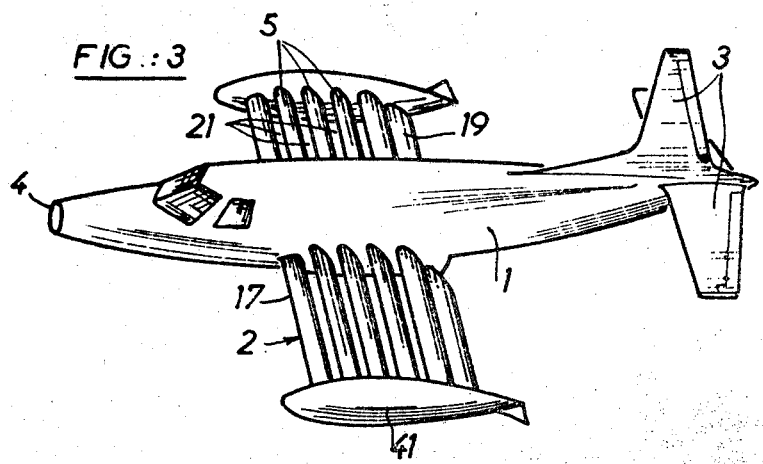
FIG. 3 is a corresponding view of an aircraft with an alternative embodiment of the present invention.

FIGS. 1 and 3 each represent an aircraft equipped with variable-geometry wings providing the lift-propulsion functions of this invention. The aircraft include in particular a fuselage 1, wings 2 and a tail unit 3.

FIG. 1 relates to a high-wing aircraft and FIG. 3 to a low-wing aircraft. Each of these aircraft is equipped with a gas generator such as a turbojet, of which only the air intake 4 is shown in these FIGS. This rearwardly located air intake in the case of FIG. 1 is, as will be seen from FIG. 5, of the reversed-flow type (an arrangement which has the advantage of considerably damping compressor intake noise in the gas generator). Alternatively, such air intake could be positioned conventionally in a forward position, as shown in FIG. 3.

Each wing 2 comprises, on the one hand, fixed members and notably a leading edge box spar 17 and a wingtip box member 41 (jointly forming a frame fixed to the fuselage) and, on the other hand, movable elements 5 (hereinafter referred to as fairings) and a high-lift flap 19. The fairings are shown herein in their extended position, in which they determine passageways 21 therebetween through which, as will be explained hereinafter, a considerable secondary flow of induced fluid from the atmosphere takes place in operation.

Figure 2:
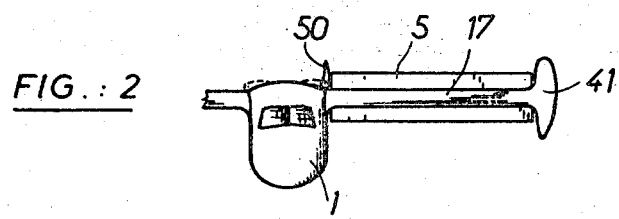
FIG. 2 is a fragmental front elevation view of the aircraft of FIG. 1.
Figure 4:
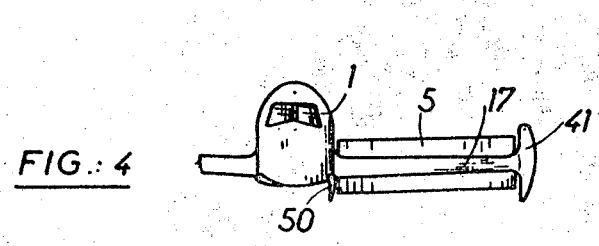
FIG. 4 shows fragmentally a front elevation of the aircraft of FIG. 3.

In order to avoid marginal eddy effects when the fairings are extended, fences 50, which may be either stationary or retractable (see FIGS. 2 and 4), are positioned longitudinally at the inboard end of each wing to cooperate with the fairing ends. Obviously, providing the wing configuration permits, these fences may be made to cooperate either with the fuselage or with the wingtip boxes.

FIGS. 5, 6, and 7 show an embodiment for the driving gas feed to the lift-propulsion system of this invention, in the specific exemplary case of an aircraft having a reversed-flow air intake 4. Through an air duct, this intake supplies a gas generator 7 shown in this example as being a gas-turbine type generator. The gases therefrom debouch into a chamber 8 the cross section of which decreases in the direction of the gas flow.

From this chamber, which performs the function of a manifold, extend angled ducts 9 (numbering three on each side in the example herein) which distribute the flow symmetrically in relation to a vertical plane through the fore-aft axis of the fuselage, into conduits 10, each of which is associated to a movable fairing. Guide vanes 11 mounted inside the ducts 9 act at the same time as spacers and stiffeners therefor, to increase their resistance to pressure. With the exception of the conduits 10, which are accommodated with the wings, it will be seen that all these elements can be integrated into the fuselage structure.

FIGS. 5 through 8 also show the component parts of a control system for actuating the movable parts of the wings. As will be explained hereinafter, these movable parts may include either fairings 5 alone, or associated fairings 5 and conduits 10. The high-lift flap 19 is rotatable about the axis of a shaft 51. To each movable portion 5 (or 5–10) and 19 is associated an actuating arm 12 which is connected through a coupling link 13 to the set of arms 12 associated to those movable fairing or fairing compounds which are positioned on the same side of the fore-aft axis of the aircraft.

To each of the two sets of movable compounds formed thus is associated a main control arm 14 which is rigid with one of the movable compounds in the set thereof and which is actuated by a link 15. The two links 15 are interconnected by a coupling shaft 16 which is in turn connected to control means at the pilot's disposal, through suitable linkage 16a.

Manifestly, however, this control system could be replaced by any other convenient actuating system.

FIGS. 8 to 11 depict more specifically the active part of the system. In FIG. 8 may be seen the parts of the control system described with reference to FIGS. 5, 6 and 7. In FIG. 8, the movable fairings 5, numbering three in the example illustrated, are in their retracted positions in which they restore the normal airfoil section of a conventional wing. FIG. 9 is a sectional view through a wing rib, showing certain structural details of the fixed and movable parts of the wing. Visible thereon are the fixed box members mentioned with reference to FIGS. 1 and 3. These boxes may be of conventional structure and comprise such parts as ribs, stringers, webbed and flanged spars, etc. Each fairing 5, which is structured to withstand bending loads, surrounds a conduit 10 through which the driving fluid from the gas generator flows. Where a hot driving fluid is used, the compartments 20 surrounding the conduits 10 are lined with heat resisting linings in order to insulate the remainder of the fairing structure from the hot conduits. It should be noted, however, that the normal air flow about the wing airfoil effectively cools the major part of the fairings and that the induced flow through the section 21 between consecutive fairings (to which further reference will be made hereinafter) also assists such cooling.

The conduits 10 are formed with discharge slots 22 through which the driving gas exhausts. In the retracted configuration shown in FIGS. 8 and 9, the gas issuing from the slots 22 flows through the sections 21 and escapes rearwardly along arrow F, substantially horizontally by virtue of appropriately contoured fairing profiles. In this configuration the jet propels the aircraft but in itself provides no significant lift force.

FIGS. 10 and 11 show the fairings 5 in their extended positions. In the embodiment depicted in FIG. 10, the fairings 5 and the conduits 10 rotate together, while in the embodiment shown in FIG. 11 only the fairings are rotatable, the conduits remaining stationary. FIGS. 9, 10 and 11 should therefore be considered for the purpose of comparing the respective positions of the discharge slots 22.

Due to an extractor effect, the driving gas discharged through the slots 22 produces a secondary or induced flow of atmosphere air drawn from the upper wing surface zone.

The resulting mass flow is greater than that of the primary jet issuing from slots 22, leading to greater thrust.

The orientation imparted to the movable fairings enables the resultant flow of augmented thrust to be directed downwardly, thereby providing the required lift for takeoff or landing.

The slotted flap 19 may also be deflected into its high-lift position, thus increasing the total momentum involved in the lift function, by deflecting the entire external flow.

The slotted flap assembly swivels together with the fairings 5.

Alternatively, the trailing edge portion of flap 19 may be actuated by means (not shown) for causing pivotal motion independently of the fairings 5.

FIGS. 12 to 15 illustrate a number of possible constructional forms of the driving gas discharge slots, it being possible to adopt any one of these forms irrespective of whether the conduits 10 are chosen movable or not.

In the embodiment of FIG. 12, the conduit 10 consists of a pipe 23, half the length of which is formed with holes 23a therein. A half-shell 25 formed with stiffening corrugations 26 is fixed to pipe 23 whereby to bound therewith a chamber 24.

The driving gas passes through the holes 23a into chamber 24 before exhausting through the slots 22 formed between consecutive corrugations 26.

In the embodiment of FIG. 13, the conduit 10 consists of a pipe 27 which is shaped with "stoved-in" portions to form the slots 22, the later being interrupted to strengthen the assembly. Elements 28 are fixed to one lip of the slots 22 whereby to obtain a convergent section for speeding up the inductive fluid and thereby improve the extractor effect.

In the embodiment shown in FIG. 14, the conduit 10 consists of two half-shells 29 and 30 of different radii interconnected by means of spacers 31, thereby providing discharge slots 22 bounded by two generatrices and interrupted at intervals by the spacers 31. As in the case of FIG. 13, elements 28 are fitted to half-shell 29 in order to speed up the inductive fluid immediately ahead of the slots.

In the embodiment shown in FIG. 15, the conduit consists of a half-shell 42 stiffened by an I-spar 43 the web of which embodies holes 43a to allow the gas flow therethrough. Another half-shell 44 of corrugated shape is fixed to half-shell 42 by welding or by any other convenient means such as by binding with a cable laid along the troughs 44a of the corrugations in half-shell 44. The slots 22, which are formed by the cooperation of these two half-shells, are no longer, strictly speaking, slots but produce a large number of small jets.

FIGS. 16 and 17 are detail views of the point of contact between a fairing and a conduit. Regardless of whether fixed or movable conduits 10 are to be adopted, the skin of the fairings 5 is in neither case fixed to conduit 10, in order to permit mutual axial slip therebetween along the arrow $f_1$ in FIG. 16 in the event of differential expansion, as well as mutual angular shifts therebetween along the arrow $f_2$ in FIG. 17 in cases where the fairings are by design movable about fixed conduits.

FIG. 18 is a sectional view of an aircraft wing, taken through the axis of a conduit 10.

FIG. 18 represents the case in which the movable compounds consists of integral fairing/conduit assemblies. Conduit 10 is rotatable in relation to the duct stubs 9, of which it is an extension. Leaktightness therebetween is obtained by the cooperation of a sealing disc 33 made of graphite or any other convenient material, which is connected to conduit 10 via a compensating union 37 and a sealing plate 34 rigid with stub 9.

The conduit 10 and the fairing 5 are united angularly at their ends remote from stub 9 by means of an elastic coupling member 45 which is fixed at one end to the closed end of conduit 10 and at the other to a supporting plate 40 rigid with fairing 5. Member 45 is thus capable of absorbing possible axial expansion of conduit 10 in relation to fairing 5.

Plate 34 houses a bearing 32a which receives the end of a coupling sleeve 36 fixed to fairing 5, coaxially therewith. A spring 35 reacts against sleeve 36 to ensure permanent contact between sealing disc 33 and plate 34.

The wingtip box member 41 houses a bearing 32b which receives a trunnion 46 rigid with supporting plate 40. The fairing 5 is thus supported by bearings 32a and 32b. Conduit 10 terminates in a journal 38 which is slidable in a bearing 39 formed within trunnion 46. It will be appreciated that conduit 10, which is freely supported at either end, respectively by the mouth of duct stub 9 and by the bearing 39, can expand axially without hindrance in relation to fairing 5, by reason of the presence of compensating union 37 and elastic member 45.

Coupling sleeve 36 supports the actuating arm 12 used to rotate the movable fairing/conduit compound.

Any axial loads generated in the movable compound are absorbed by bearings 32a and 32b, which to that end are designed as thrust bearings. It will be appreciated that conduit 10 cannot be the seat of any axial stresses.

FIG. 20 is a corresponding illustration of the means used to support the movable elements, in the specific instance where the conduits 10 are stationary and only the fairings 5 are rotatable. With conduit 10 fixed, the rotary seal system described previously is dispensed with, together with elastic coupling member 45.

The theory of operation of the lift and propulsion system will be clearly apparent from the explanations given hereinabove. It should be noted that when it is desired to cause the external flow to assist in the lift function by deflecting it downwardly, notably by means of a high-lift device such as slotted flap 19, the aircraft must be possessed of a certain forward speed. This suggests that, for takeoff purposes, it may be useful to begin by leaving the variable-geometry system in its retracted configuration in order to facilitate acceleration during the ground roll over a short distance, and then to adopt the extended configuration for takeoff proper.

Figure 21:
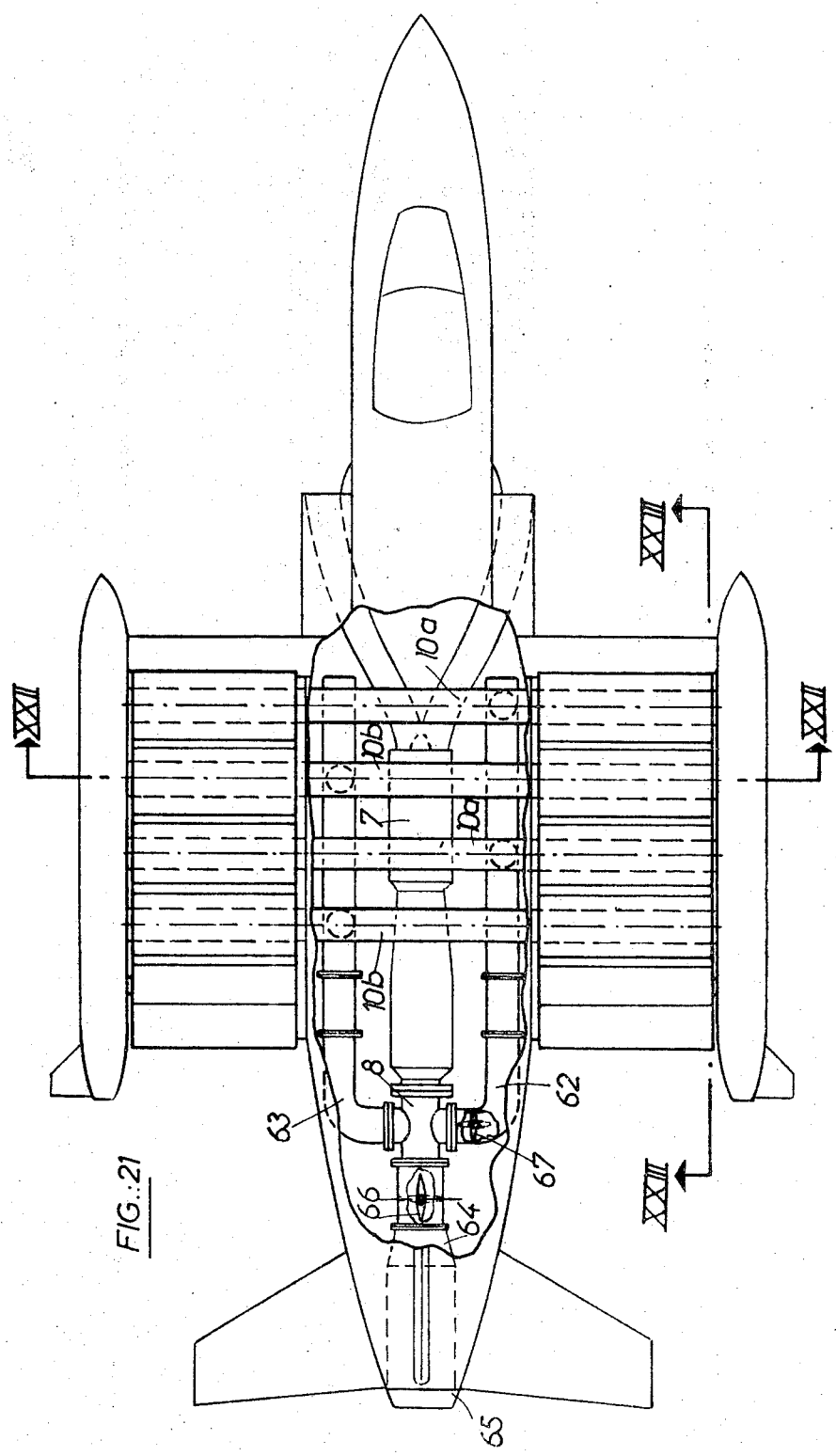
FIG. 21 is a plan view with partial cutaway of a pressure fluid distributor device wherein the gas generators are adapted to supply an aft jet pipe or exhaust nozzle.
Figure 23:
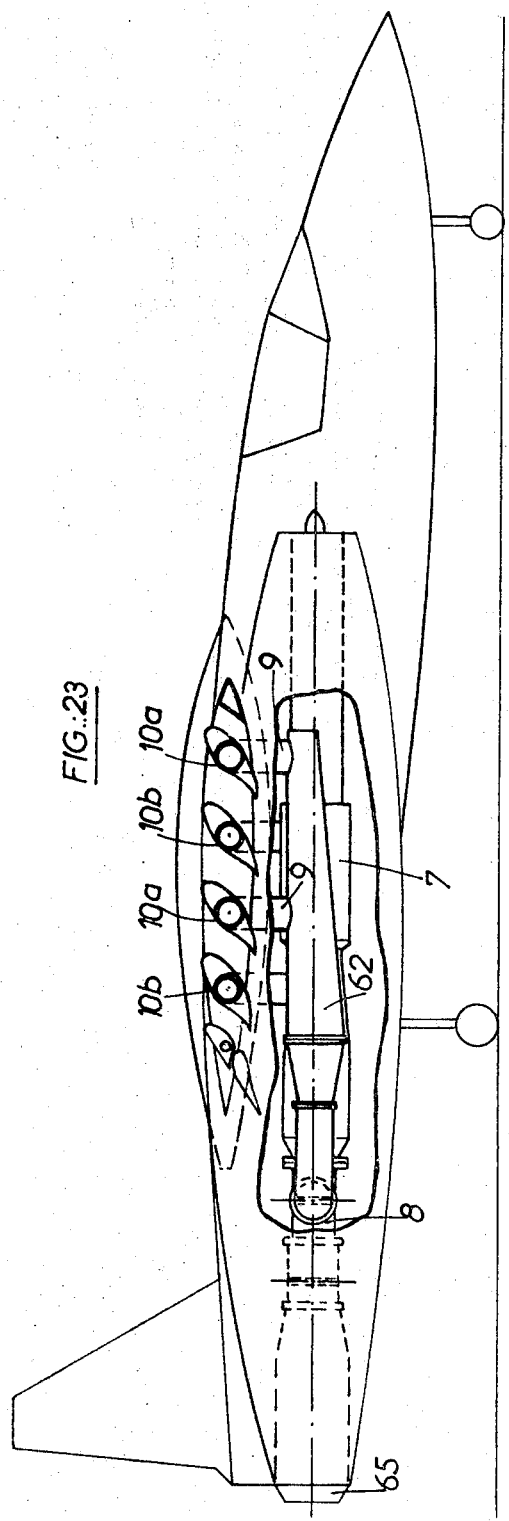
FIG. 23 is a side elevation view with partial cutaway corresponding to FIG. 21.
Figure 22:
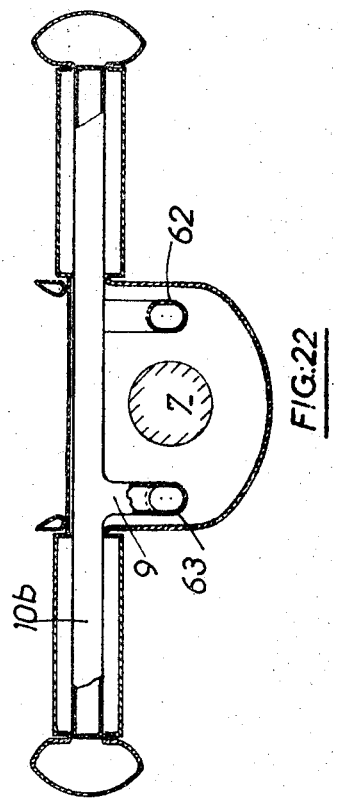
FIG. 22 is a section on the line XXII–XXII of FIG. 21.

In FIGS. 21 to 23, the hollow wing elements or fairings are supplied off a gas generator 7, the gas produced thereby being channelled into a chamber 8.

Three bypasses 62, 63, 64 connect with chamber 8.

Bypass 64 allows the gas to be exhausted longitudinally and rearwardly of the aircraft by a jetpipe nozzle 65 having a possibly adjustable outlet section. Bypasses 62 and 63 are used to supply, through ducts 9, the conduits 10 associated to the fairings. Bypass 62 supplies the conduits 10a and bypass 63 the conduits 10b. Thus the conduits 10 associated to the fairings are in this instance no longer supplied from a single duct, but instead employ two ducts, with each feeding alternate conduits whereby to jointly feed the complete set of conduits.

A valve 66 is connected into bypass 64 and a further valve 67, preferably coupled to valve 66, is connected into bypass 62.

The system just disclosed functions as follows:

When valve 66 prevents the flow of gas through bypass 64, valve 67 is open and conduits 10a and 10b receive the full flow of gas from generator 7. The lift/propulsion system operates in similar fashion to that described with reference to FIGS. 1 through 20.

On the other hand, when for any reason whatsoever, such as adequate forward speed to provide aerodynamic lift, or a runway of sufficient length to make short takeoff or landing distances unnecessary, the aircraft can dispense with part of the lift available, valve 67 is closed, thereby causing only the slots of conduits 10b to be supplied but not those of conduit 10a.

The two possible forms of utilization of the system are shown in FIGS. 24a and 24b respectively. In FIG. 24a the movable fairings are in the position of maximum extension and the conduits 10a and 10b (of which there are two each in the example depicted) are all supplied with driving gas. In contradistinction, in FIG. 24b only the conduits 10b are supplied. It should be noted that in this latter mode, i.e. when one out of every two conduits is supplied, each throat or interval between consecutive fairings fulfills its function.

It is consequently possible to use each throat or interval between successive movable fairings to obtain a diluted effect (since only one slot out of two remains supplied), but the elimination of one out of every two slots calls for matching the throat width, which can be done by virtue of the mobility of the fairings.

The throats bounded by a fairing not supplied with pressure gas and by a wing airfoil such as the leading edge box spar or the high-lift flap, may be obturated by a flap 68 as shown in FIG. 24b. When all the fairings are fed with pressure gas, this flap is in the position shown in FIG. 24a.

When valve 67 is closed, valve 66 is open so that part of the gas flow can be discharged through exhaust nozzle 65 (which is matched to such mass flow) and thereby propel the aircraft.

Valves 67 and 66 can be operated simultaneously by means of lever means or the like (not shown).

Figure 26:
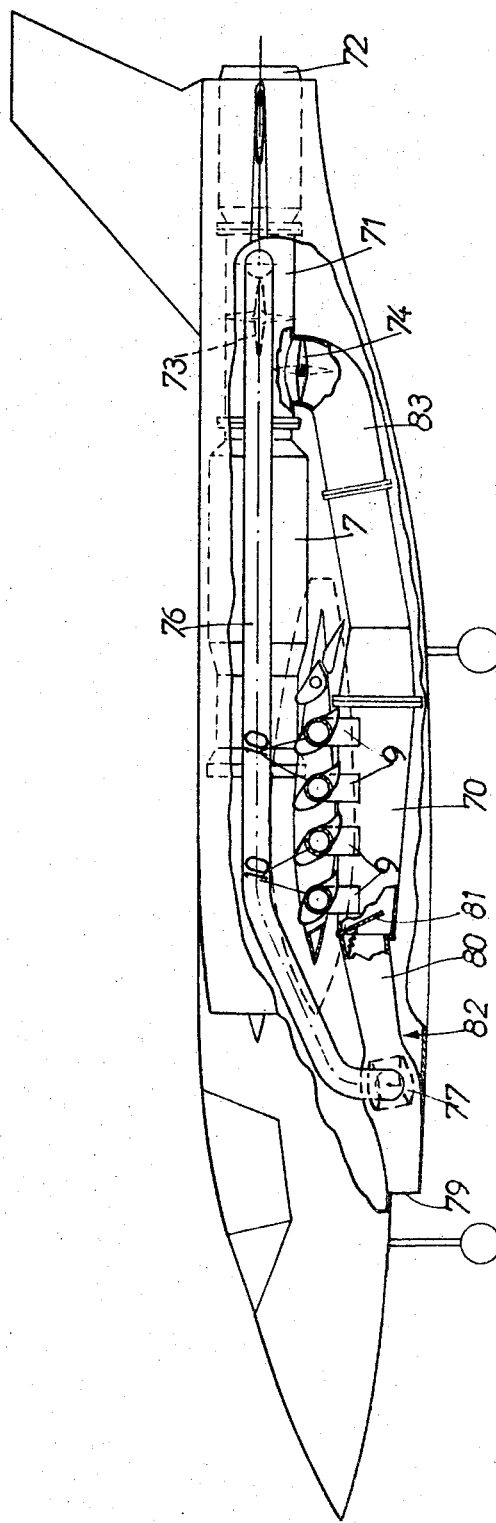
FIG. 26 shows in side elevation with partial cutaway the device of FIG. 25.
Figure 27:
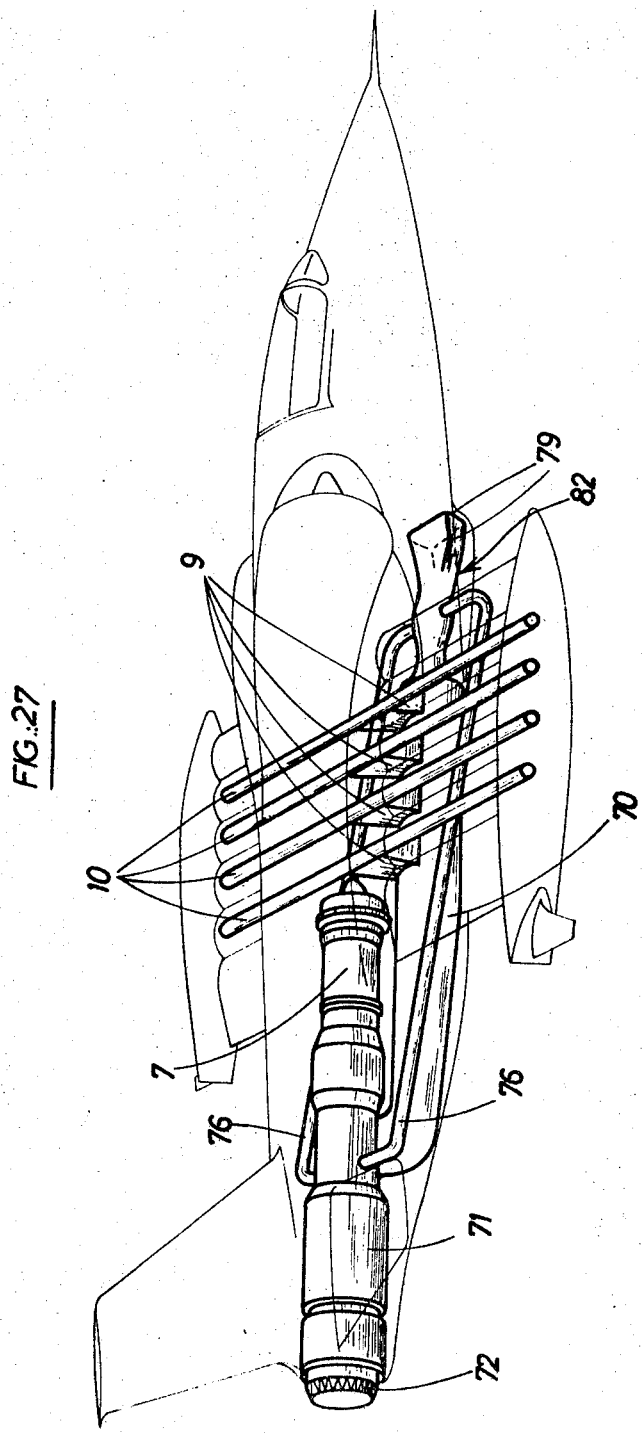
FIG. 27 is a perspective showing of the embodiment of FIGS. 25 and 26.

This particular configuration can be adopted for instance during the ground roll phase prior to takeoff, such phase being an acceleration phase; the same configuration can be adopted for high-speed flight also. In the alternative constructional form shown in FIGS. 25 to 27, the gas generator 7 delivers gas under pressure either into a chamber 70 or into a duct 71 equipped at its end with an exhaust nozzle 72. Valves 73 and 74 operate simultaneously to allow gas to flow either into chamber 70 through a duct 83, or into duct 71, thus providing a system operating on the all-or-none principle.

From chamber 70 the gas under pressure is delivered to the fairings through ducts and interconnecting elements similar to those described with reference to FIGS. 1 through 20. In cases where valve 73 is closed and valve 74 open, the theory of operation of the system is similar to that described with reference to FIGS. 1 through 20.

When valve 74 is closed and valve 73 open, the aircraft is propelled by the gases discharged through exhaust nozzle 72, which can be useful for high-speed flight.

Conduits 76 connected to duct 71 are used to draw off part of the driving flow, which is discharged through an annular nozzle 77 into a mixer 78 forming part of a diluting device 82, the intake 79 of which takes advantage of part of the dynamic pressure resulting from the forward speed of the aircraft when such speed is high enough.

A diffuser 80 is positioned downflow of the mixer to recover the pressure energy and feed the chamber 70 and thence the remainder of the system.

A check valve 81 seals off the chamber 70 when the latter is supplied otherwise than by diluting device 82.

Suitable dimensioning of conduits 76, diluting device 82, mixer 78, diffuser 80 and exhaust nozzle 72 makes it possible to find the setting which best matches the flight speed considered.

Preferably, a certain number of the above-mentioned parts may be of the variable-geometry type, and in particular the intake 79, which is of two-dimensional section in plan view, could comprise a hinged surface for varying the passageway section therethrough.

Noteworthy advantages of the subject system of this invention, over and above those mentioned previously are, firstly, the low operating noise resulting from the extensive fragmentation of the inductive jet and by the induction effect, thereby enabling airline operations to take place closer to built-up areas, and secondly the reduced jet temperature and velocity resulting from the dilution effect, which makes ground erosion problems less acute and can be an obvious advantage in near-hovering flight, when the gas jet is directed towards the ground.

It goes without saying that many changes and substitutions of parts may be made in the specific forms of embodiment described hereinabove for exemplary purposes only, without departing from the scope of the invention.

I claim:

1. A lift and propulsion system for an aircraft comprising pivotable vane-shaped sections extending spanwise of said aircraft and angularly adjustable to a retracted position in which they cluster together in close adjacency and blend to form a compact wing of airfoil design, and to a protruded position in which they are chordwise spaced apart and mutually define passages having substantially unobstructed top and bottom ends, motive gas supply pipes extending spanwise of said aircraft within said sections and in substantial tangency with the outer surfaces of said sections, and slotlike nozzles extending along the lines of tangency of said supply pipes and outer surfaces in boundary parts of said passages intermediate said ends thereof, said slotlike nozzles opening into said passages generally tangentially to said boundary parts thereof in the direction of said bottom ends thereof and being fed with motive gas from said supply pipes to discharge at the boundary of said passages energizing sheetlike jets which induce air through said passages from top to bottom thereof.

2. A system according to claim 1, additionally including means for permitting axial expansion by said pipes relative to said vane-shaped section.

3. A system according to claim 2, wherein said means consists of a trunnion rigid with said streamlined member and carrying an axial expansion bearing, and of a fixed bearing, an end portion of said pipes cooperating with said axial expansion permitting means.

4. A system as claimed in claim 1, wherein said supply pipes are stationary and said pivotable sections are angularly displaceable in substantially slidable contact engagement therewith.

5. A system according to claim 4, additionally comprising elastic coupling members between each pipes and each vane-shaped section associated thereto.

6. A system according to claim 4, comprising thrust bearings associated to said vane-shaped section.

7. A system according to claim 4, wherein the means for moving said streamlined members are common to all such streamlined members.

8. A system as claimed in claim 1, wherein said sections are shaped to define convergent-divergent passages having a minimum area throat level with said lines of tangency, whereby said slotlike nozzles open at the throat of said passages.

9. A system as claimed in claim 1, wherein said pipes comprise cylindrical ducts which are ported over semicylindrical portions thereof, and semicylindrical shells of greater diameter than said ducts and fitted over said ported portions thereof in radially spaced relation therewith.

10. A system as claimed in claim 1, wherein said pipes comprise two semicylindrical shells of different diameters facing each other.

11. A lift and propulsion system for an aircraft having wings, comprising at least one motive gas generator, a common manifold chamber supplied with motive gas from said generator, a set of motive gas supply pipes branching from said manifold chamber and accommodated in a spanwise portion at least of said wings, said supply pipes comprising thin-jet discharge slots positioned along at least one generatrix thereof, a streamlined member associated to each of said conduits, means for moving said streamlined members from a retracted position in which they blend with the normal airfoil design of said wings into an operative position in which they define a downwardly directed passage through which a flow of atmospheric air is induced by the jets discharged by said slots, a diluting device adapted to pick up the dynamic pressure resulting from the forward speed of said aircraft and connected to said manifold chamber, and a diffuser in said diluting device connected to said manifold chamber through a check valve.

UNITED STATES PATENT OFFICE
CERTIFICATE OF CORRECTION

Patent No. 3,545,701          Dated December 8, 1970

Inventor(s) Jean Henri Bertin and Jean Lucien Charles Cayla

It is certified that error appears in the above-identified patent and that said Letters Patent are hereby corrected as shown below:

Column 8, line 28, delete "streamlined member" and insert -- vane-shaped section --; lines 41 - 43, delete in their entirety and insert -- 7. A system according to claim 4 including means for moving said vane-shaped sections, said moving means being common to all such vane-shaped sections. --.

Signed and sealed this 10th day of August 1971.

(SEAL)
Attest:

EDWARD M. FLETCHER, JR.          WILLIAM E. SCHUYLER, JR.
Attesting Officer                 Commissioner of Patents